United States Patent
Kim et al.

(10) Patent No.: US 7,357,510 B2
(45) Date of Patent: Apr. 15, 2008

(54) PROJECTION-TYPE 3-D IMAGE DISPLAY DEVICE USING SINGLE PROJECTOR

(75) Inventors: Tae-hee Kim, Suwon-si (KR); Kye-hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 11/265,166

(22) Filed: Nov. 3, 2005

(65) Prior Publication Data

US 2006/0152679 A1 Jul. 13, 2006

(30) Foreign Application Priority Data

Jan. 7, 2005 (KR) ........................ 10-2005-0001548

(51) Int. Cl.
*G03B 21/00* (2006.01)
*G03B 21/14* (2006.01)
*G03B 21/60* (2006.01)
*G02B 27/24* (2006.01)
*G02B 27/26* (2006.01)
*G02B 27/28* (2006.01)
*H04N 15/00* (2006.01)
*H04N 5/74* (2006.01)
*G02F 1/1335* (2006.01)
*G02F 1/13* (2006.01)
*C09K 19/02* (2006.01)

(52) U.S. Cl. .............. 353/7; 353/10; 353/20; 353/121; 359/458; 359/465; 359/472; 359/478; 359/495; 359/496; 359/497; 348/57; 348/58; 348/59; 348/762; 348/771; 349/15; 349/177; 349/186; 349/194

(58) Field of Classification Search ............... 353/10, 353/7, 8, 20, 30, 121, 122; 349/5, 7, 8, 11, 349/15, 96, 177, 179, 186, 194, 201; 359/13, 359/443, 462–465, 471–473, 478, 479, 494, 359/495, 497, 618, 621–625, 627–630, 632, 359/638–640, 880; 348/42, 54, 57–59, 115, 348/739, 744, 752, 750, 751, 758, 762, 771; 345/419, 6–8, 154
See application file for complete search history.

(56) References Cited

U.S. PATENT DOCUMENTS 6,779,892 B2    8/2004  Agostinelli et al.

(Continued)

FOREIGN PATENT DOCUMENTS

JP    10-023464    1/1998

(Continued)

*Primary Examiner*—Rochelle Blackman
(74) *Attorney, Agent, or Firm*—Stanzione & Kim; LLP

(57) ABSTRACT

A projection-type 3-D image display device includes a single display element, a polarization conversion switch, a first image shifter, a second image shifter, a projection lens unit, a mirrored light tunnel, and a screen unit. The screen unit includes an image separation unit. The single display element emits light polarized in a first polarization direction according to an input image. The polarization conversion switch time-sequentially converts the first polarization direction of the light emitted by the display element into a second polarization direction. The first image shifter transmits the light having the first polarization direction to form a first image and refracts the light having the second polarization direction to form a second image. The second image shifter faces the first image shifter and is arranged apart from the first image shifter by a predetermined interval. The projection lens unit enlarges and projects the first and second images. The mirror light tunnel allows the first and second images to be focused to different view points. The image separation unit delivers the first and second images to the left and right eyes, respectively.

18 Claims, 6 Drawing Sheets

U.S. PATENT DOCUMENTS

2002/0180659 A1* 12/2002 Takahashi .................... 345/4
2004/0090601 A1   5/2004 Nakanishi et al.

FOREIGN PATENT DOCUMENTS

| | | |
|---|---|---|
| JP | 2001-337295 | 12/2001 |
| JP | 2003-107399 | 4/2003 |
| JP | 2003-302602 | 10/2003 |
| KR | 10-0184364 | 12/1998 |
| KR | P2001-42479 | 5/2001 |
| KR | P2001-113294 | 12/2001 |

* cited by examiner

PROJECTION-TYPE 3-D IMAGE DISPLAY DEVICE USING SINGLE PROJECTOR

CROSS-REFERENCE TO RELATED APPLICATIONS

This application claims the benefit under 35 U.S.C. §119 from Korean Patent Application No. 2005-1548, filed on Jan. 7, 2005, in the Korean Intellectual Property Office, the disclosure of which is incorporated herein in its entirety by reference.

BACKGROUND OF THE INVENTION

1. Field of the Invention

The present general inventive concept relates to a projection-type 3-dimensional (3-D) image display device, and more particularly, to a projection-type 3-D image display device achieving a small size thereof by realizing a 3-D image using a single projector and improving a resolution of the 3-D image.

2. Description of the Related Art

Generally, a 3-D image is realized using the principle of stereo visual sense through two eyes of a human being. A binocular parallax, which occurs because left and right eyes of a viewer are located about 65 mm apart from each other, is the most important factor producing a cubic effect. A 3-D image display may be a display using glasses or a glassless display. The glassless display obtains a 3-D image by separating left/right images without using glasses. The glassless displays may be classified into a parallax barrier type display and a lenticular type display.

The parallax barrier type display alternately prints images that should be seen respectively by the left and right eyes in the form of a vertical pattern or a photo (in order to see the printed image using an extremely thin vertical lattice column, i.e., a barrier). By doing so, a vertical pattern image that is to be provided to the left eye and a vertical pattern image that is to be provided to the right eye are distributed by the barrier, and images at different viewpoints are seen by the left and the right eyes, respectively, so that a stereo image is perceived.

A projection-type image display device enlarges an image formed by a display element, projects the enlarged image on a screen unit using a projection lens unit, and realizes a 3-D image using a left/right eye image separation unit included in the screen unit. FIG. 1A is a schematic view of a conventional projection-type image display device. The conventional projection-type image display device includes a first projector 10 and a second projector 20, and produces a 3-D image by separating images into first images from the first projector 10 and second images from the second projector 20 and sending the first and second images to a right eye (RE) and a left eye (LE), respectively, using a screen unit S.

The screen unit S has a parallax barrier 25 in order to separate the images from the projectors 10 and 20 into the first images for the RE and the second images for the LE. Referring to FIG. 1A, the parallax barrier 25 has slits 26 and barriers 27 arranged in an alternate manner. The images from the first and second projectors 10 and 20 are separated into the first images L for the LE and the second images R for the RE by the slits 26 to form the 3-D image.

According to a conventional method, since the images are formed and blocked by the slits 26 and the barriers 27, respectively, the images L are formed, e.g., at even-numbered lines only and blocked by the barrier 27 so that black lines K are formed at odd-numbered lines as illustrated in FIG. 1B. Similarly, the images R are formed, e.g., at odd-numbered lines only and blocked by the barrier 27 so that the black lines K are formed at even-numbered lines.

Therefore, the resolution of the conventional projection-type image display device as well as the brightness of the 3-D image, deteriorates. Further, since the two projectors 10 and 20 are used to produce the images L and R, a volume of the conventional projection-type image display device is increased, not meeting a consumer's demand for a small size device.

SUMMARY OF THE INVENTION

The present general inventive concept provides a projection-type 3-D image display device to improve the resolution of a 3-D image and to achieve a small size thereof by realizing the 3-D image using a single projector.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a projection-type 3-D image display device to enlarge and to project an input image to display a 3-D image, the device including a single display element to emit light having a first polarization direction according to the input image, a polarization conversion switch to time-sequentially convert the first polarization direction of the emitted light in a second polarization direction, a first image shifter to transmit the light having the first polarization direction after passing through the polarization conversion switch, to form a first image, and to refract the light having the polarization direction after passing through the polarization conversion switch, to form a second image, a second image shifter disposed apart by a predetermined distance from the first image shifter and to face the first image shifter to refract the light having the second polarization so that the second image is shifted by a predetermined shifting distance relative to the first image, a projection lens unit to enlarge and to project the first and second images, a mirrored light tunnel to allow the first and second images to be focused at a first view point and a second view point, respectively, and a screen unit having an image separation unit to deliver the first and second images to first and second positions, for example, a left eye and a right eye, respectively.

The first image shifter may include an array of first image shifter units each having a first prism and a first birefringence element bonded to the first prism in a facing manner to transmit or to refract the light passing through the first image shifter depending on the polarization direction of the light.

The first prism may be disposed on a first side of the first image shifter to which light is incident, and the first birefringence element may be disposed on a second side of the first image shifter from which the light is emitted.

The second image shifter may include an array of second image shifter units each having a second birefringence element to transmit or to refract light passing through the second image shifter depending on the polarization direction of the light and a second prism bonded to the second birefringence element.

The second birefringence element may be disposed on a first side of the second image shifter to which the light is incident, and the second prism may be disposed on a second side of the second image shifter from which the light is emitted.

The first and second birefringence elements may be made of calcite or nematic liquid crystal.

When an interval between the first and second image shifters is 'd', an upper prism angle of the first and second prisms is '$\theta_p$', a refractive index of the first and second birefringence elements for the first image is $n_1$, and a refractive index of the first and second birefringence elements for the second image is $n_2$, a shift distance 'w' between the first and second images may be controlled by changing at least one of 'd' and '$\theta_p$' using the following Equation.

$$w = d\tan\left\{\sin^{-1}\left(\frac{n_1}{n_2}\sin\theta_p\right)\theta_p\right\} \quad \text{[Equation]}$$

The display element may be a liquid crystal display (LCD), a ferro LCD (FLCD), or a movable mirror device.

The polarization conversion switch may be a liquid crystal (LC) polarization converter.

The display element may be a movable mirror device, and the projection-type 3-D image display device may further comprise a polarization converter disposed between the display element and the polarization conversion switch to convert unpolarized light into light of one polarization.

The image separation unit may be a lenticular lens, a fly-eye lens, a parallax-barrier, or an LC barrier.

The foregoing and other aspects of the present general inventive concept may also be achieved by providing a method of splitting images usable in a projection-type image display device having a single projector to emit light, the method including generating first light having a first polarization direction and second light having a second polarization direction from the emitted light, transmitting the first light in a transmission direction to form a first image, and refracting the second light in a direction having an first angle with the transmission direction to form a second image, propagating first image and second image for a predetermined distance, and transmitting the first light and refracting the second light in a second direction having a second angle with the transmission direction so that the second light is shifted by a predetermined shifting distance with respect to the first image and the second direction is parallel to the transmission direction.

The foregoing and other aspects of the present general inventive concept may also be achieved by providing a method of forming 3-D images using only one projector, the method including emitting light according to an input image, splitting the emitted light to produce a first image having a first polarization by transmitting the emitted light in a transmission direction, and a second image having a second polarization by refracting the emitted light, the second image being shifted in a direction parallel to the transmission direction of the first image, and delivering the first image to a first position and the second image to a second position, such that the delivered first image and the delivered second image form a 3-D image.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
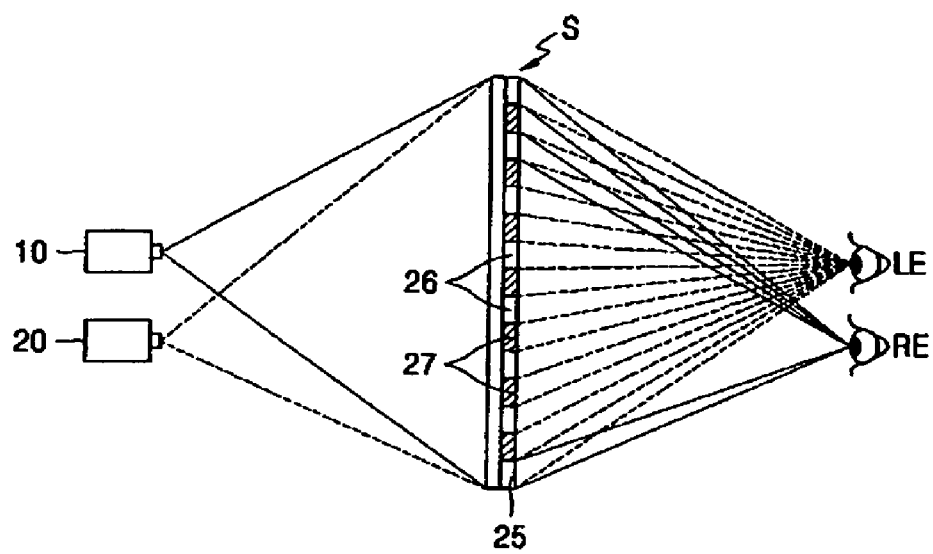
FIG. 1A is a schematic view of a conventional projection-type 3-D image display device according to a conventional parallax-barrier type.
Figure 1B:
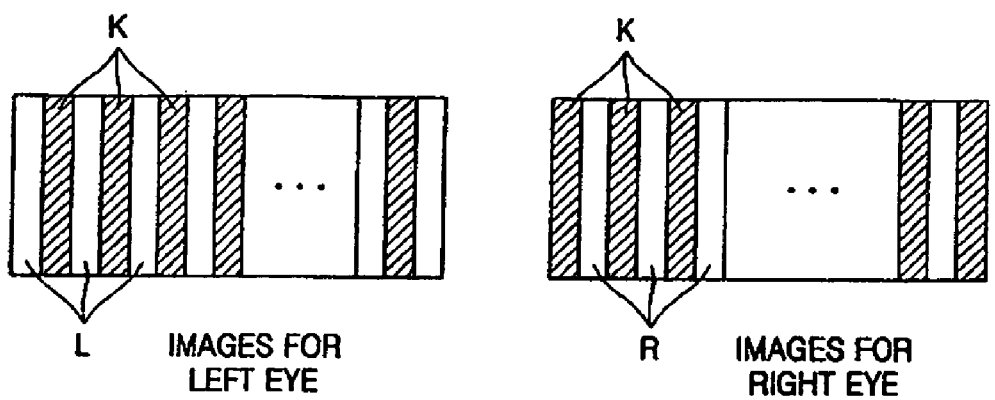
FIG. 1B is a view illustrating images for a left eye and images for a right eye displayed by the conventional projection-type 3-D image display device illustrated in FIG. 1A.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
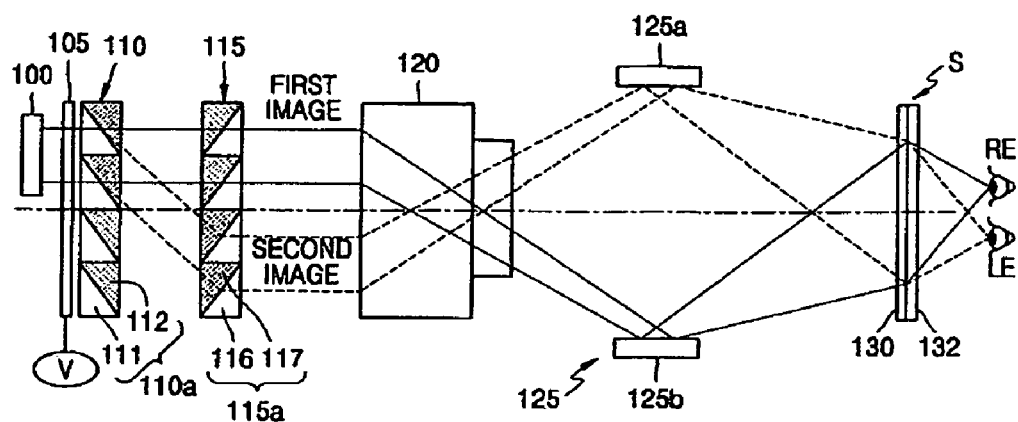
FIG. 2 is a view illustrating a projection-type 3-D image display device according to an embodiment of the present general inventive concept.

FIG. 2 is a view illustrating a projection-type 3-D image display device according to an embodiment of the present general inventive concept to realize a stereo image by time-sequentially or alternatively displaying images L for a left eye (LE) and images R for a right eye (RE) using a single projector. The 3-D image display device thereby includes a display element 100 to produce images and a member to time-sequentially or alternatively shift the images L or R.

In order to shift the images L or R produced by a display element 100, the 3-D image display device has a polarization conversion switch 105 to time-sequentially, alternatively or selectively convert a polarization direction of incident light. Further, a first shifter 110 and a second shifter 115 are spaced apart from each other by a predetermined interval to shift the images L or R according to the polarization direction of the light after passing through the polarization conversion switch 105. The display element 110 and the first and second shifters 110 and 115 can be used as an image-splitting unit.

First images having a first polarization unchanged by the polarization conversion switch 105 are transmitted through the first and second shifters 110 and 115. Second images having a second polarization are time-sequentially or selectively shifted by the polarization conversion switch 105 and the first and second shifters 110 and 115. The first images and the second images are enlarged and projected on a screen unit S through a projection lens unit 120.

The first and second images are incident on the screen unit S at different angles and separated into and displayed on the RE and the LE, respectively, through the screen unit S, so that a 3-D image is realized.

A liquid crystal display (LCD), a ferro LCD (FLCD), or a movable mirror device can be adopted for the display element 100. The LCD or the FLCD displays an image by applying an electric field to liquid crystal using a thin film transistors (TFTs) and electrodes formed in pixel units. The movable mirror device includes a plurality of micro-mirrors arranged 2-dimensionally. The micro-mirrors can rotate independently. An incident beam propagates toward a projection lens unit or deviates from the projection lens unit, depending on a rotational direction of each micro-mirror. Consequently, the micro-mirror is on/off-operated by a pixel unit, so that an image is realized.

In the embodiment of the present general inventive concept, the display element 100 can be a polarization-dependant LCD, an FLCD, a transmissive type, or a reflective type. The polarization conversion switch 105 can be an LC (liquid crystal) polarization converter to convert the polarization direction of incident light by selectively applying a power to each pixel.

The first image shifter 110 includes first prisms 111 and first birefringence elements 112 whose refractive index changes depending on the polarization direction of the incident light. The first prisms 111 and the first birefringence elements 112 may have a trigonal prism shape and are attached to each other. The first prisms 111 are disposed on a first side of the first image shifter 110 to which light is incident, and the first birefringence elements 112 are disposed on a second side of the first image shifter 110 from which light is emitted. That is, the first prisms 111 include a major surface disposed on the first side of the first image shifter 110 and side surfaces disposed adjacent to corresponding side surfaces of the first birefringence element 112, and a major surface of the first birefringence element 112 is disposed on the second side of the first image shifter 110. A plurality of the first image shifter units 110a having the first prism 111 and the first birefringence element 112 can be provided and arranged in the form of an array. Alternatively, the first image shifter 110 can also include a single prism and a single birefringence element.

The first birefringence element 112 has a property that its refractive index changes depending on the polarization direction of the incident light. That is, a normal light ray having a polarization direction parallel with a crystal optical axis of the first birefringence element 112 is transmitted in a straight line, according to a normal refractive index of the first birefringence element, and an abnormal light ray having a polarization direction perpendicular to the crystal optical axis of the first birefringence element 112 is refracted according to an abnormal refractive index of the first birefringence element 112. Therefore, when light of P polarization and light of S polarization pass through the first birefringence element 112, the light is refracted at different angles due to their different polarizations. The abnormal light ray represents a light having different polarization from the normal light ray. The first birefringence element 112 can be made of calcite or nematic liquid crystal, for example.

The first prism 111 has the same refractive index as the normal refractive index of the first birefringence element 112. The normal light ray, e.g., the light of P polarization, passes through a boundary surface between the first prism 111 and the first birefringence element 112 without refraction, and the abnormal light ray, e.g., the light of S polarization, is refracted at the boundary surface.

The second image shifter 115 includes second prisms 116 and second birefringence elements 117 whose refractive index changes depending on the polarization direction of incident light. The second birefringence elements 117 and the second prisms 116 may have a trigonal prism shape and are attached or disposed adjacent to each other. The second birefringence elements 117 are disposed on a first side of the second image shifter 115 to which the light is incident and the second prisms 116 are disposed on a second side of the second image shifter 115 from which the light is emitted so that the second birefringence elements 117 and the second prisms 116 may be symmetric with the first birefringence elements 112 and the first prisms 111, respectively.

A plurality of second image shifter units 115a each having the second prism 116 and the second birefringence element 117 can be provided and arranged in the form of an array. Alternatively, the second image shifter 115 can also include a single prism and a single birefringence element.

The first shifter 110 transmits the first images of the first polarization and refracts the second images of the second polarization to allow the first and second images to propagate along different optical paths. Also, the second shifter 115 changes by refraction the propagation angle of the second images so that the second images may progress in parallel with the first images. Consequently, the second images are shifted horizontally by a predetermined interval relative to the first images.

Figure 3:
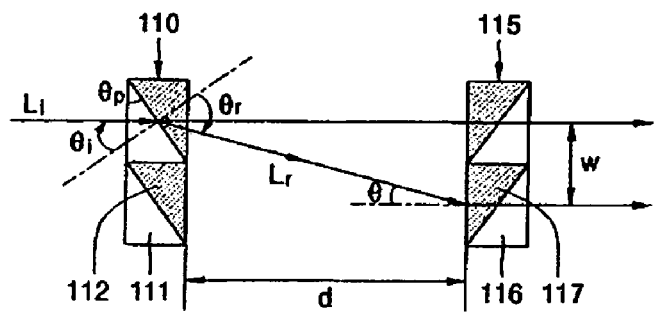
FIG. 3 is a view illustrating a first and a second image shifter included in the projection-type 3-D image display device of FIG. 2.

FIG. 3 illustrates a relationship between an interval 'd' between the first and second image shifters 110 and 115, and a prism angle $\theta_p$ when the second images are shifted by an image shift distance 'w' relative to the first images by passing through the first and second shifters 110 and 115. The prism angle $\theta_p$ represents an upper vertical angle of the first or second prism. The shift distance 'w' of the second images can be controlled by changing at least one of the interval 'd' between the first and second shifters 110 and 115 and the prism angle $\theta_p$.

When a refractive index of the birefringence elements 112 and 117 for a normal light ray is $n_1$, and a refractive index for an abnormal light ray is $n_2$, a refractive index of the prisms 111 and 116 is $n_1$. The incident angle and the refraction angle of a light ray Li incident to the first birefringence element 112 are $\theta_i$, $\theta_r$, respectively. Here, the prism angle $\theta_p$ may be the same as the incident angle $\theta_i$. According to Snell's law, we have the following Equation 1.

$$\frac{n_1}{n_2} = \frac{\sin\theta_r}{\sin\theta_i} \qquad \text{[Equation 1]}$$

When a slope angle of a light ray $L_r$ refracted by the first birefringence element 112 is θ, a relation of $\theta=(\theta_r-\theta_i)$ is given and a relation among θ, d, and w is given by the following Equation 2.

$$\tan\theta = \tan(\theta_r - \theta_i) \sim = \sim \frac{w}{d} \qquad \text{[Equation 2]}$$

Equation 2 can be rewritten for the image shift distance 'w' as follows.

$$w = d\,\tan(\theta_r-\theta_i) \qquad \text{[Equation 3]}$$

Next, using $\theta_i=\theta_p$ and Equation 1, a relation $$\sin(\theta_r) = \left(\frac{n_1}{n_2}\right)\sin\theta_i = \left(\frac{n_1}{n_2}\right)\sin\theta_p$$

is derived. Using this relation, Equation 3 can be rewritten as follows.

$$w = d\tan\left\{\sin^{-1}\left(\frac{n_1}{n_2}\sin\theta_p\right) - \theta_p\right\} \qquad \text{[Equation 4]}$$

It is possible to control the image shift distance 'w' of the second image relative to the first image using the interval 'd' between the first and second image shifters 110 and 115 or the prism angle according to Equation 4. For example, a display element having an aspect ratio of 16:9 is 2.3 cm in horizontal length and 1 cm in vertical length. If the refractive index $n_1$ of the prism is 1.5 and the normal refractive index $n_1$ and the abnormal refractive index $n_2$ of the birefringence element are 1.5 and 1.7, respectively, and the prism angle $\theta_p$ is 60° so that 'w'=1 cm, then the interval 'd' between the shifters is approximately 2.7 cm.

The first images of the first polarization and the second images of the second polarization are time-sequentially formed by the polarization conversion switch and the first and second image shifters 110 and 115. Then, the first and second images sequentially pass through the projection lens unit 120. The first and second images are incident on the screen unit S at different angles after passing through a mirrored light tunnel 125. That is, the mirrored light tunnel 125 allows the first and second images to be focused at different view points.

The mirrored light tunnel 125 can be a mirror having four sides or can include mirrors arranged on the left and right sides with respect to the horizontal direction of the screen unit S. In FIG. 2, a first mirror 125a and a second mirror 125b are exemplarily arranged on the left and right sides with respect to the horizontal direction of the screen unit S.

The screen unit S includes a screen 130 and an image separation unit 132 to separate the images enlarged and projected by the projection lens unit 120 into images L for the LE and images R for the RE and to send the images L and R to the LE and the RE, respectively. The image separation unit 132 can be a lenticular lens, a fly-eye lens, or a parallax-barrier. Also, the image separation unit 132 can be an LC (liquid crystal) barrier switching between a 2-D mode and a 3-D mode.

Figure 4A:
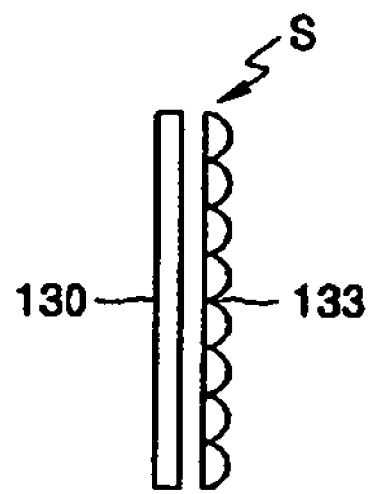
FIGS. 4A and 4B are views exemplarily illustrating an image separation unit included in a screen unit of the projection-type 3-D image display device of FIG. 2.
Figure 4B:
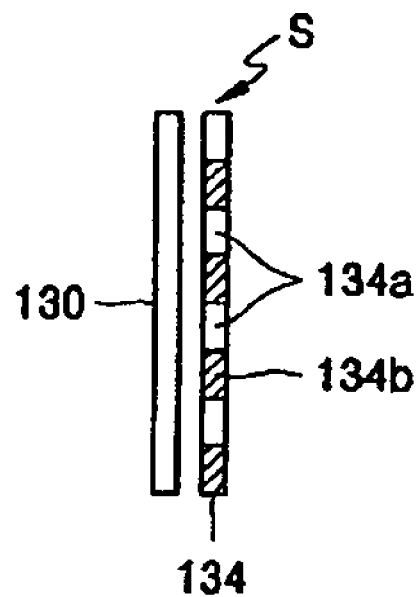

FIG. 4A exemplarily illustrates a lenticular lens 133 adopted as the image separation unit 132 of FIG. 2. The lenticular lens 133 separates the images incident to the screen unit S into the images L and R by allowing the light incident at different angles to be focused at different points, respectively. FIG. 4B exemplarily illustrates a parallax-barrier 134 adopted as the image separation unit 132 of FIG. 2. The parallax-barrier 134 includes slits 134a and barriers 134b alternately arranged, and separates the images into the images L and R by allowing the light incident at different angles to be focused at different points through the slits 134a and the barriers 134b.

The lenticular lens 133, the parallax-barrier 134, or the fly-eye lens can produce a 3-D image by separating the images incident through the projection lens unit 120 into the images L and R and allowing the images L and R to be focused into the LE and the RE, respectively. Such image separation units can realize a three-dimensional (3-D) mode only, not switching the 3-D mode into a two-dimensional (2-D) mode.

Figure 5A:
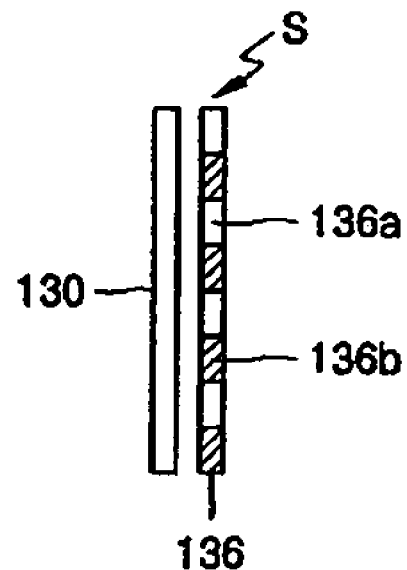
FIGS. 5A and 5B are views illustrating a liquid crystal (LC) barrier operation when the LC barrier is adopted as an image separation unit included in the screen unit of the projection-type 3-D image display device FIG. 2.
Figure 5B:
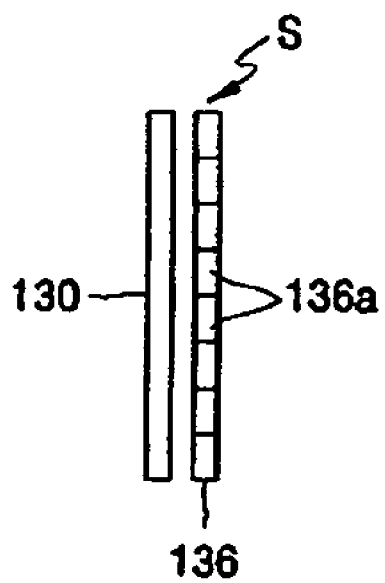

In contrast, an image separation unit having an LC (liquid crystal) barrier 136 illustrated in FIG. 5A can selectively switch between a 3-D mode and a 2-D mode. The LC barrier 136 can selectively form slits 136a or barriers 136b using on/off operations of electrodes coupled with the LC. Also, it is possible to transmit the projected images without separating the images into the images L and R by turning off all of the electrodes of the LC barrier 136 such that to make the LC barrier to include only the slits 136a as illustrated in FIG. 5B. Through such a process, the same images that have passed through the projection lens unit 120 are provided to the LE and the RE, so that a 2-D image is realized.

An operation of projecting a 3-D image using the display device of FIG. 2 will be described with reference to FIGS. 6A and 6B.

Images emitted from the display element 100 have a predetermined first polarization direction, e.g., a P polarization direction, and are incident on the polarization conversion switch 105. When the polarization conversion switch is in an off-state, the images of the first polarization direction are transmitted without changing the first polarization direction. When the first polarization direction has a polarization direction parallel with a crystal optical axis of the first birefringence element 112, the first images of the first polarization direction pass through the first prism 111 and the first birefringence element 112 without refraction. For example, light of P polarization passes through the first birefringence element 112 without refraction, and light of S polarization is refracted by the first birefringence element 112.

Figure 6A:
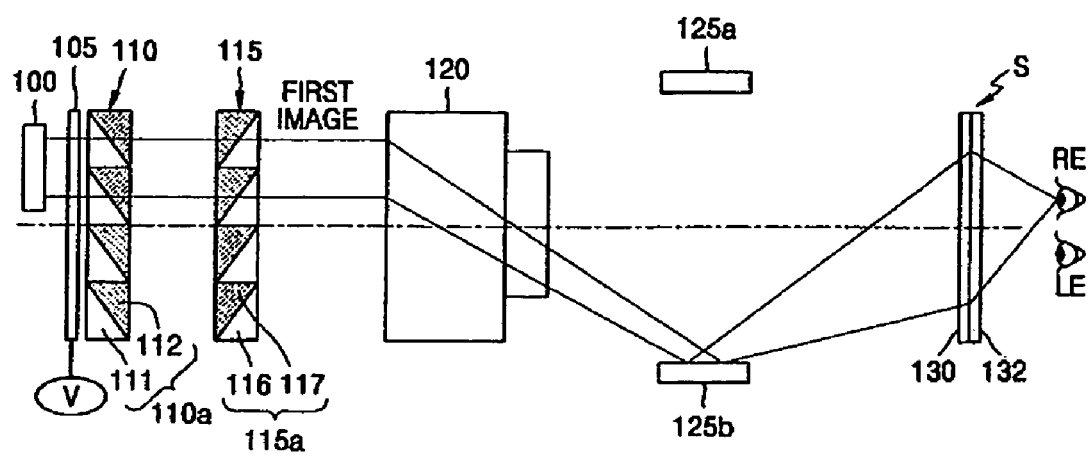
FIGS. 6A and 6B are views illustrating how a 3-D image is realized in the projection-type 3-D image display device of FIG. 2.
Figure 6B:
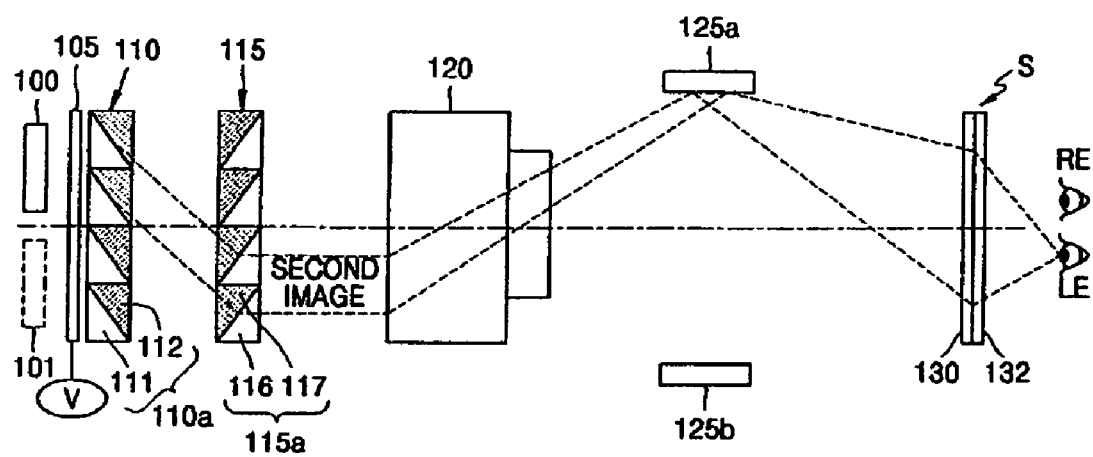

Referring to FIG. 6A, the first images of the first polarization direction that have passed through the first birefringence element 112 and the second birefringence element 117 without refraction are incident on the mirrored light tunnel 125 through the projection lens unit 120. The first images are refracted by the inside of the mirrored light tunnel 125 or reflected by a surface of the mirrored light tunnel, incident on the screen unit S at a predetermined angle, and provided to, for example, the RE through the image separation unit 132.

Subsequently, when the first images of the first polarization direction are incident on the polarization conversion switch 105, and the polarization conversion switch 105 becomes an on-state the polarization direction of the images is changed. That is, the first polarization direction is converted into the second polarization direction by the polarization conversion switch 105. Then, the second images having the second polarization direction are incident to the first birefringence element 112. The second images of the second polarization direction, e.g., an S polarization, have a polarization direction perpendicular to the crystal optical axis of the first birefringence element 112 and are refracted to a first direction different from the direction of the light having the first polarization as illustrated in FIG. 6B.

The refracted second images of the second polarization are refracted by the second birefringence element 117 to a second direction opposite to the first direction. Consequently, after passing through the first birefringence element 112 and the second birefringence element 117, the second images having the second polarization direction are shifted by a predetermined interval in parallel relative to the first images. Thus, when the second images pass through the first birefringence element 112 and the second birefringence element 117 an effect occurs as if a virtual display element 101 were arranged in parallel with the display element 100 to transmit second images in a direction parallel to that of the first images as shown in FIG. 6B. The second images are incident on the screen unit S at angles different from the angles of the first images through the projection lens unit 120 and the mirrored light tunnel 125. Accordingly, the second images are displayed as the images L on the LE through the image separation unit 132.

The polarization conversion switch 105 operates at the same frequency as an image signal of the display element 100, and operates in synchronization with the image signal of the display element 100. For example, if an image signal processing frequency of the display element 100 is 60 Hz, the polarization conversion switch 105 performs an on-off operation every unit of 1/60 sec. That is, the polarization conversion switch 105 performs one cycle of the on-off operation for one image signal of the display element 100 so that the first images of the first polarization and the second images of the second polarization are sequentially output.

If the polarization conversion switch 105 is in the off-state, the polarization direction of the images is unchanged so that the images according to image signals from the display element 100 are transmitted through the first and second birefringence elements 112 and 117 without changing their polarization direction to form the first images. In contrast, if the polarization conversion switch 105 is in the on-state, the polarization direction of the images according to the image signals from the display element 100 is changed and the images are refracted by the first and second birefringence elements 112 and 117 to form the second images shifted relative to the first images.

Consequently, the images R of the first polarization direction and the images L of the second polarization direction are combined to produce a one frame 3-D image.

Next, a projection-type image display device according to another embodiment of the present general inventive concept will be described in detail with reference to FIG. 7.

The image display device includes a display element 200 to produce an image, a polarization converter 203 to convert light of the image into light of one polarization direction, and a polarization conversion switch 205 to selectively convert the polarization direction of incident light. In this embodiment, a movable mirror device is adopted for the display element 200, and the polarization converter 203 to convert unpolarized light into polarized light is disposed between the display element 200 and the polarization conversion switch 205. After the images produced by the display element 200 are converted into images of one polarization direction by the polarization converter 203, first images of the first polarization and second images of the second polarization shifted relative to the first images are time-sequentially formed by the polarization conversion switch 205 and a first and a second shifters 210 and 215.

The first and second images are enlarged and projected by a projection lens unit 220, are incident on the screen unit S at different angles after passing through a mirrored light tunnel 225, and are delivered to the RE and the LE, respectively, so that a 3-D image is produced.

The first image shifter 210 includes an array of first image shifter units 210a each consisting of a first prism 211 and a first birefringence element 212, and the second image shifter 215 includes an array of second image shifter units 215a each consisting of a second prism 216 and a second birefringence element 217. Also, the mirrored light tunnel 225 has a first mirror 225a and a second mirror 225b facing each other.

The screen unit S includes a screen 230 and an image separation unit 232. The image separation unit 232 can be a lenticular lens, a fly-eye lens, or an LC barrier as descried with reference to FIGS. 4A, 4B, 5A, and 5B.

Figure 7:
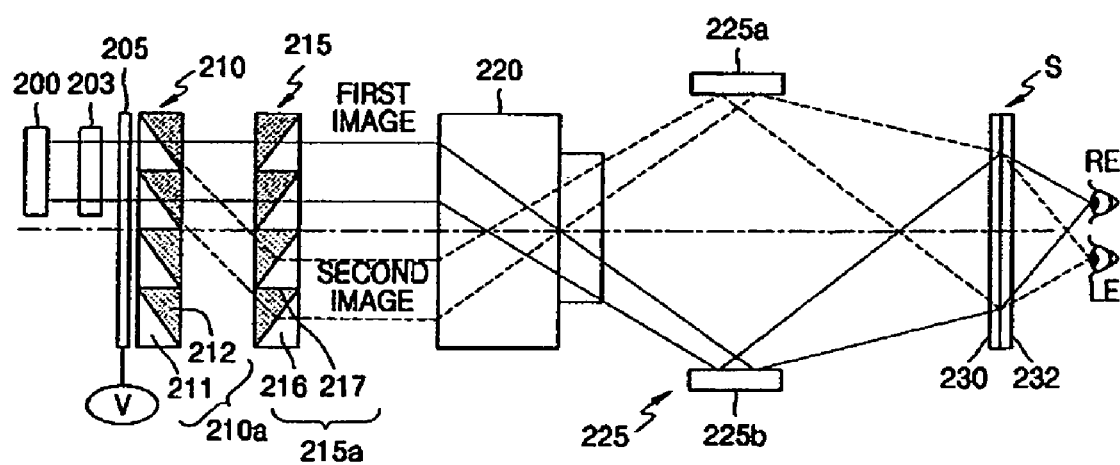
FIG. 7 is a view of a projection-type 3-D image display device according to another embodiment of the present general inventive concept.

This embodiment of FIG. 7 is different from the previously described embodiment in that the movable mirror device is adopted for the display element and the polarization converter 203 converting unpolarized light into light of one polarization is further provided. Since constructions and operations of the elements of the present embodiment are the same as those of the previous embodiment, detailed descriptions thereof will be omitted.

The image display device can realize the 3-D image using a single projector by shifting an image for one signal to provide images at a plurality of view points using a pair of image shifters.

The projection-type 3-D image display device includes a polarization conversion switch and an image shifter to time-sequentially shift images produced by a single display element, thereby realizing the 3-D image using a single projector. Accordingly, the volume of the projection-type 3-D image display device is small and the manufacturing cost can be reduced.

Further, an LC barrier is adopted for the image separation unit so that the projection-type 3-D image display device can be switched between a 2-D mode and a 3-D mode as desired by an observer. In addition, a 3-D image is enlarged and projected on the screen, so that a large-scale 3-D image can be realized.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection-type 3-D image display device to enlarge and project an input image to display a 3-D image, the projection-type 3-D image display device comprising:
    a single display element to emit light having a first polarization direction according to the input image;
    a polarization conversion switch to time-sequentially convert the first polarization direction of the emitted light in a second polarization direction;
    a first image shifter to transmit the light having the first polarization direction to form a first image, and to refract the light having the second polarization direction to form a second image;
    a second image shifter disposed apart by a predetermined distance from the first image shifter to refract the light having the second polarization direction to shift the second image by a predetermined shifting distance relative to the first image;
    a projection lens unit to enlarge and project the first and second images;
    a mirrored light tunnel to allow the first and second images to be focused at a first view point and at a second view point, respectively; and
    a screen unit having an image separation unit to deliver the first and second images to a first position and a second position, respectively.

2. The device of claim 1, wherein the first image shifter comprises:
    an array of first image shifter units each having a first prism and a first birefringence element bonded to the first prism in a facing manner, the first birefringence element selectively transmitting or refracting the light passing through the first image shifter depending on the first and second polarization directions of the light.

3. The device of claim 2, wherein the first prism is disposed on a first side of the first image shifter to which light passing through the first image shifter is incident, and the first birefringence element is disposed on a second side of the first image shifter from which the light is emitted.

4. The device of claim 2, wherein the second image shifter comprises:
an array of second image shifter units each having a second birefringence element and a second prism bonded to the second birefringence element such that the light is selectively transmitted or refracted according to the first and the second polarization directions.

5. The device of claim 4, wherein the second birefringence element is disposed on a first side of the second image shifter on which light passing through the second image shifter is incident, and the second prism is disposed on a second side of the second image shifter from which the light is emitted.

6. The device of claim 2, wherein the first birefringence element comprises calcite or nematic liquid crystal.

7. The device of claim 4, wherein the second birefringence element comprises calcite or nematic liquid crystal.

8. The device of claim 4, wherein when an interval between the first and second image shifters is 'd', an upper prism angle of the first and second prisms is '$\theta_p$', a refractive index of the first and second birefringence elements for the second image is $n_2$, and a refractive index of the first and second prism, and the first and second birefringence elements for the first image is $n_1$, a shift distance 'w' between the first and the second images is controlled by changing at least one of the interval 'd' and the upper prism angle '$\theta_p$' using the following Equation:

$$w = d\tan\left\{\sin^{-1}\left(\frac{n_1}{n_2}\sin\theta_p\right)\theta_p\right\}.$$ [Equation]

9. The device of claim 1, wherein the display element comprises one of a liquid crystal display (LCD), a ferro LCD (FLCD), and a movable mirror device.

10. The device of claim 1, wherein the polarization conversion switch comprises an LC (liquid crystal) polarization converter.

11. The device of claim 1, wherein the display element comprises:
a movable mirror device to generate unpolarized light; and
a polarization converter disposed between the movable mirror device and the polarization conversion switch to convert the unpolarized light into light of one polarization.

12. The device of claim 1, wherein the image separation unit is one of a lenticular lens, a fly-eye lens, and a parallax-barrier.

13. The device of claim 1, wherein the image separation unit comprises an LC barrier to selectively switch between a 2-D image mode and a 3-D image mode.

14. A method of splitting images usable in a projection-type image display device having a single projector to emit light, the method comprising:
generating a first light having a first polarization direction and second light having a second polarization direction from the emitted light;
transmitting the first light in a transmission direction to form a first image, and refracting the second light in a direction having a first angle with the transmission direction to form a second image;
propagating the first image and the second image for a predetermined distance;
transmitting the first light and refracting the second light in a second direction having a second angle with the transmission direction so that the second light is shifted by a predetermined shifting distance with respect to the first image and the second direction is parallel to the transmission direction; and
focusing the first and second images at a first view point and at a second view point, respectively, using a mirrored light tunnel.

15. A method of forming 3-D images using only one projector, the method comprising:
emitting light according to an input image;
splitting the emitted light to produce a first image having a first polarization by transmitting the emitted light in a transmission direction, and a second image having a second polarization by refracting the emitted light, the second image being shifted in a direction parallel to the transmission direction of the first image;
focusing the first and second images at a first view point and at a second view point, respectively, using a mirrored light tunnel; and
delivering the first image to a first position and the second image to a second position, such that the delivered first image and the delivered second image form a 3-D image.

16. A projection-type 3-D image display device to enlarge and project an input image to display a 3-D image, the projection-type 3-D image display device comprising:
a single display element to emit light having a first polarization direction according to the input image;
a polarization conversion switch to convert the first polarization direction of the emitted light in a second polarization direction;
a first image shifter to transmit the light having the first polarization direction to form a first image, and to refract the light having the second polarization direction to form a second image, the first image shifter comprising:
an array of prisms disposed on a first side of the first image shifter on which the light having the first and the second polarization directions passing through the first image shifter is incident, and
an array of first birefringence elements disposed on a second side of the first image shifter from which the light having the first and the second polarization directions is emitted;
a second image shifter to refract the light having the second polarization direction to shift the second image by a predetermined shifting distance relative to the first image; and
a screen unit having an image separation unit to deliver the first and second images to a first position and a second position, respectively.

17. The projection-type 3-D image display device of claim 16, wherein second image shifter comprises:

an array of second birefringence elements disposed on a first side of the second image shifter on which the light having the second polarizing direction passing through the second image shifter is incident, and an array of second prisms disposed on a second side of the second image shifter from which the light having the second polarizing direction is emitted.

18. The projection-type 3-D image display device of claim 16, further comprising:

a plurality of mirrors to allow the first and second images to be focused at a first view point and at a second view point, respectively.

* * * * *